US008639413B2

United States Patent
Endo

(10) Patent No.: US 8,639,413 B2
(45) Date of Patent: Jan. 28, 2014

(54) VEHICLE POWER SUPPLY SYSTEM AND METHOD FOR CONTROLLING THE SAME

(75) Inventor: Hiroki Endo, Nissin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 209 days.

(21) Appl. No.: 13/259,328

(22) PCT Filed: Sep. 9, 2009

(86) PCT No.: PCT/JP2009/065702
§ 371 (c)(1),
(2), (4) Date: Sep. 23, 2011

(87) PCT Pub. No.: WO2011/030401
PCT Pub. Date: Mar. 17, 2011

(65) Prior Publication Data
US 2012/0022744 A1    Jan. 26, 2012

(51) Int. Cl.
*G06F 7/00*    (2006.01)

(52) U.S. Cl.
USPC ............ 701/35; 324/428; 324/429; 318/139; 180/65.27; 180/65.28; 180/65.29

(58) Field of Classification Search
USPC .................. 701/36; 324/428–429; 318/139; 180/65.27, 65.28, 65.29; 323/428–429
See application file for complete search history.

(56) References Cited

U.S. PATENT DOCUMENTS

| 5,555,737 | A    | 9/1996 | Takeo et al. |
| 5,656,916 | A    | 8/1997 | Hotta |
| 6,242,873 | B1 * | 6/2001 | Drozdz et al. ................. 318/139 |
| 6,586,940 | B2 * | 7/2003 | Asakura et al. ............... 324/426 |

(Continued)

FOREIGN PATENT DOCUMENTS

| JP | 06-165308 A | 6/1994 |
| JP | 07-193901 A | 7/1995 |

(Continued)

OTHER PUBLICATIONS

Dynamic model and control algorithm of HVAC system for dynamic wireless charging EV application; In-Soo Suh ; Kibeom Lee ; Minyoung Lee; Electric Machines & Drives Conference (IEMDC), 2013 IEEE International; Digital Object Identifier: 10.1109/IEMDC.2013.6556259; Publication Year: 2013 , pp. 241-246.*

(Continued)

*Primary Examiner* — Cuong H Nguyen
(74) *Attorney, Agent, or Firm* — Kenyon & Kenyon LLP

(57) ABSTRACT

A power supply system comprises a chargeable power storage device; a charging device configured to perform external charging for charging the power storage device using alternating-current power supplied from an external power supply; an air conditioner receiving electric power from the charging device and the power storage device and air-conditioning a compartment in a vehicle; an auxiliary machinery load; and an ECU. The ECU controls at least one of the charging device and the auxiliary machinery load so as to increase the electric power output from the power storage device in a case where overcharging of the power storage device is expected when the air conditioner is intermittently operated during external charging.

14 Claims, 12 Drawing Sheets

(56) References Cited

U.S. PATENT DOCUMENTS

| | | | |
|---|---|---|---|
| 7,213,665 | B2 | 5/2007 | Yamaguchi et al. |
| 7,224,132 | B2 * | 5/2007 | Cho et al. .................. 318/139 |
| 7,259,664 | B1 * | 8/2007 | Cho et al. .................. 340/450.2 |
| 7,426,910 | B2 | 9/2008 | Elwart |
| 7,478,691 | B2 | 1/2009 | Yamaguchi et al. |
| 7,715,957 | B2 | 5/2010 | Yamaguchi et al. |
| 2009/0024267 | A1 | 1/2009 | Kawai |
| 2010/0089669 | A1 * | 4/2010 | Taguchi .................. 180/65.1 |
| 2010/0318250 | A1 | 12/2010 | Mitsutani |
| 2010/0318252 | A1 | 12/2010 | Izumi |

FOREIGN PATENT DOCUMENTS

| | | | |
|---|---|---|---|
| JP | 07-212902 | A | 8/1995 |
| JP | 08-065814 | A | 3/1996 |
| JP | 08-065816 | A | 3/1996 |
| JP | 08-268036 | A | 10/1996 |
| JP | 09-076740 | A | 3/1997 |
| JP | 2000-078701 | A | 3/2000 |
| JP | 2001-063347 | A | 3/2001 |
| JP | 2002-247774 | A | 8/2002 |
| JP | 2004-147379 | A | 5/2004 |
| JP | 2004-166367 | A | 6/2004 |
| JP | 2006-057583 | A | 3/2006 |
| JP | 2007-245999 | A | 9/2007 |
| JP | 2009-201170 | A | 9/2009 |
| WO | 2009034872 | A1 | 3/2009 |
| WO | 2009104305 | A1 | 8/2009 |

OTHER PUBLICATIONS

Design and Research on Air Conditioning Control Network of Electric Vehicle Based on CAN-Bus; Fan Xin ; Hu Chun Measuring Technology and Mechatronics Automation (ICMTMA), 2010 International Conference on; vol. 1 Digital Object Identifier: 10.1109/ICMTMA.2010.496; Publication Year: 2010 , pp. 970-973.*

Sensitivity analysis on battery modeling to large-scale PHEV/PEV charging algorithms; Wencong Su ; Mo-Yuen Chow IECON 2011—37th Annual Conference on IEEE Industrial Electronics Society; Digital Object Identifier: 10.1109/IECON.2011.6119831; Publication Year: 2011 , pp. 3248-3253.*

Energy distribution in Plug in Hybrid Electric Vehicle power trains; Szumanowski, A.; Power Engineering, Energy and Electrical Drives (POWERENG), 2011 International Conference on; Digital Object Identifier: 10.1109/PowerEng.2011.6036570 Publication Year: 2011 , p. 1.*

International Search Report mailed Dec. 1, 2009 of PCT/JP2009/065702.

Japanese Office Action mailed Nov. 6, 2007 in JP 2004/242426 and English translation thereof.

Japanese Office Action mailed Jul. 27, 2007 in JP 2004/242426 and English translation thereof.

Mitsutani, N., Espacenet, English-language abstract of WO2009034872, published Mar. 19, 2009.

Izumi, J., Espacenet, English-language abstract of WO2009104305, published Aug. 27, 2009.

* cited by examiner

WHEN AIR CONDITIONER OPERATES

WHEN AIR CONDITIONER ABRUPTLY STOPS

DURING DISCHARGING OF BATTERY

OUTPUT LOWER LIMIT: Wout_chgf=Pbd−Wout

DURING CHARGING OF BATTERY

OUTPUT UPPER LIMIT: Win_chgf=Win+Pbd

VEHICLE POWER SUPPLY SYSTEM AND METHOD FOR CONTROLLING THE SAME

CROSS REFERENCE TO RELATED APPLICATION

This is a 371 national phase application of PCT/JP2009/065702 filed Sep. 9, 2009, the content of which is incorporated herein by reference in its entirety.

TECHNICAL FIELD

The present invention relates to a vehicle power supply system and a method for controlling the vehicle power supply system, and more particularly to charging control for charging a power storage device mounted in a vehicle with the electric power supplied from an external power supply.

BACKGROUND ART

In recent years, an electrically powered vehicle equipped with a power storage device (for example, a secondary battery, a capacitor and the like) and running with the driving force generated from the electric power stored in the power storage device has received attention as an environmentally-friendly vehicle. This electrically powered vehicle includes, for example, an electric vehicle, a hybrid vehicle, a fuel cell vehicle, and the like. The technique for charging the power storage device mounted in the above-described electrically powered vehicle by a commercial power supply having a high power generation efficiency is proposed.

The hybrid vehicle also includes a known vehicle equipped with a power storage device that can be charged by a power supply external to the vehicle (hereinafter simply referred to as an "external power supply"). For example, the so-called "plug-in hybrid vehicle" is known which is provided with a power storage device that can be charged by a household power supply through the charging cable connecting between the power receptacle provided in the house and the charging port provided in the vehicle. Accordingly, an improvement in the fuel consumption efficiency of the hybrid vehicle can be expected.

Furthermore, in some of the above-described electrically powered vehicles, the air conditioner for air-conditioning the compartment in the vehicle may be driven with the electric power from the power storage device. In the vehicle configured as described above, the compartment within the vehicle can be air-conditioned even when the vehicle is stopped.

Japanese Patent Laying-Open No. 2006-057583 (PTL 1) discloses the so-called pre-air conditioning control in the hybrid vehicle for performing air conditioning while the vehicle is stopped.

CITATION LIST

Patent Literature

PTL 1: Japanese Patent Laying-Open No. 2006-057583

SUMMARY OF INVENTION

Technical Problem

In the vehicle that can be charged with the electric power from an external power supply, the air conditioner may be driven with the electric power mainly from the external power supply when pre-air conditioning is performed during external charging.

The air conditioner may often intermittently operate during pre-air conditioning. In such a case, a delay in decreasing the electric power output from the charging device in response to the abrupt stop of the air conditioner causes a gradual increase in the charge power in the power storage device, with the result that the power storage device may be overcharged.

The present invention has been made in order to solve the above-described problems. An object of the present invention is to provide a vehicle having a power storage device that can be charged by an external power supply with a power supply system capable of preventing the power storage device from being overcharged at the time of pre-air conditioning during external charging.

Solution to Problem

A vehicle power supply system according to the present invention includes a chargeable power storage device, a charging device, an air conditioner, an auxiliary machinery load receiving electric power from the power storage device, and a control device. The charging device performs external charging for charging the power storage device using alternating-current (AC) power supplied from an external power supply. The air conditioner receives the electric power from the charging device and the power storage device and air-conditions a compartment in a vehicle. The control device controls at least one of the charging device and the auxiliary machinery load so as to increase the electric power output from the power storage device in a case where overcharging of the power storage device is expected when the air conditioner is intermittently operated during the external charging.

Preferably, the control device detects a state of charge of the power storage device, and, when the state of charge of the power storage device is greater than a first reference value, causes the charging device to stop supplying the electric power.

Preferably, the control device sets a discharge power upper limit value of the power storage device based on the state of charge of the power storage device, and, in a case where the electric power output from the power storage device exceeds the discharge power upper limit value, causes the charging device to output an excess amount of the electric power over the discharge power upper limit value even when the state of charge of the power storage device is greater than the first reference value.

Preferably, the control device increases the electric power output from the charging device when the state of charge of the power storage device is less than a second reference value less than the first reference value.

Preferably, the second reference value is a charge target value at a time when the external charging for the power storage device is completed.

Preferably, the control device detects a state of charge of the power storage device, and, when the state of charge of the power storage device is greater than a first reference value, causes the auxiliary machinery load to consume the electric power stored in the power storage device.

Preferably, the control device causes the auxiliary machinery load to stop consuming the electric power stored in the power storage device when the state of charge of the power storage device is less than a second reference value less than the first reference value.

Preferably, the power storage device includes a plurality of power storage devices.

A method for controlling a vehicle power supply system according to the present invention is provided. A vehicle includes a chargeable power storage device, a charging device, an air conditioner, and an auxiliary machinery load receiving electric power from the power storage device. The charging device performs external charging for charging the power storage device using AC power supplied from an external power supply. The air conditioner receives the electric power from the charging device and the power storage device and air-conditions a compartment in a vehicle. The controlling method includes the steps of causing the air conditioner to operate during the external charging; and, in a case where overcharging of the power storage device is expected when the air conditioner is intermittently operated, controlling at least one of the charging device and the auxiliary machinery load so as to increase the electric power output from the power storage device.

Preferably, the controlling method further includes the steps of detecting a state of charge of the power storage device, and, when the state of charge of the power storage device is greater than a first reference value, causing the charging device to stop supplying the electric power.

Preferably, the controlling method further includes the steps of setting a discharge power upper limit value of the power storage device based on the state of charge of the power storage device, and, in a case where the electric power output from the power storage device exceeds the discharge power upper limit value, causing the charging device to output an excess amount of the electric power over the discharge power upper limit value even when the state of charge of the power storage device is greater than the first reference value.

Preferably, the controlling method further includes the step of increasing the electric power output from the charging device when the state of charge of the power storage device is less than a second reference value less than the first reference value.

Preferably, the controlling method further includes the steps of detecting a state of charge of the power storage device, and, when the state of charge of the power storage device is greater than a first reference value, causing the auxiliary machinery load to consume the electric power stored in the power storage device.

Preferably, the controlling method further includes the step of causing the auxiliary machinery load to stop consuming the electric power stored in the power storage device when the state of charge of the power storage device is less than a second reference value less than the first reference value.

Advantageous Effects of Invention

According to the present invention, in the vehicle power supply system equipped with a power storage device which can be charged by an external power supply, the power storage device can be prevented from being overcharged at the time of pre-air conditioning during external charging.

DESCRIPTION OF EMBODIMENTS

Figure 1:
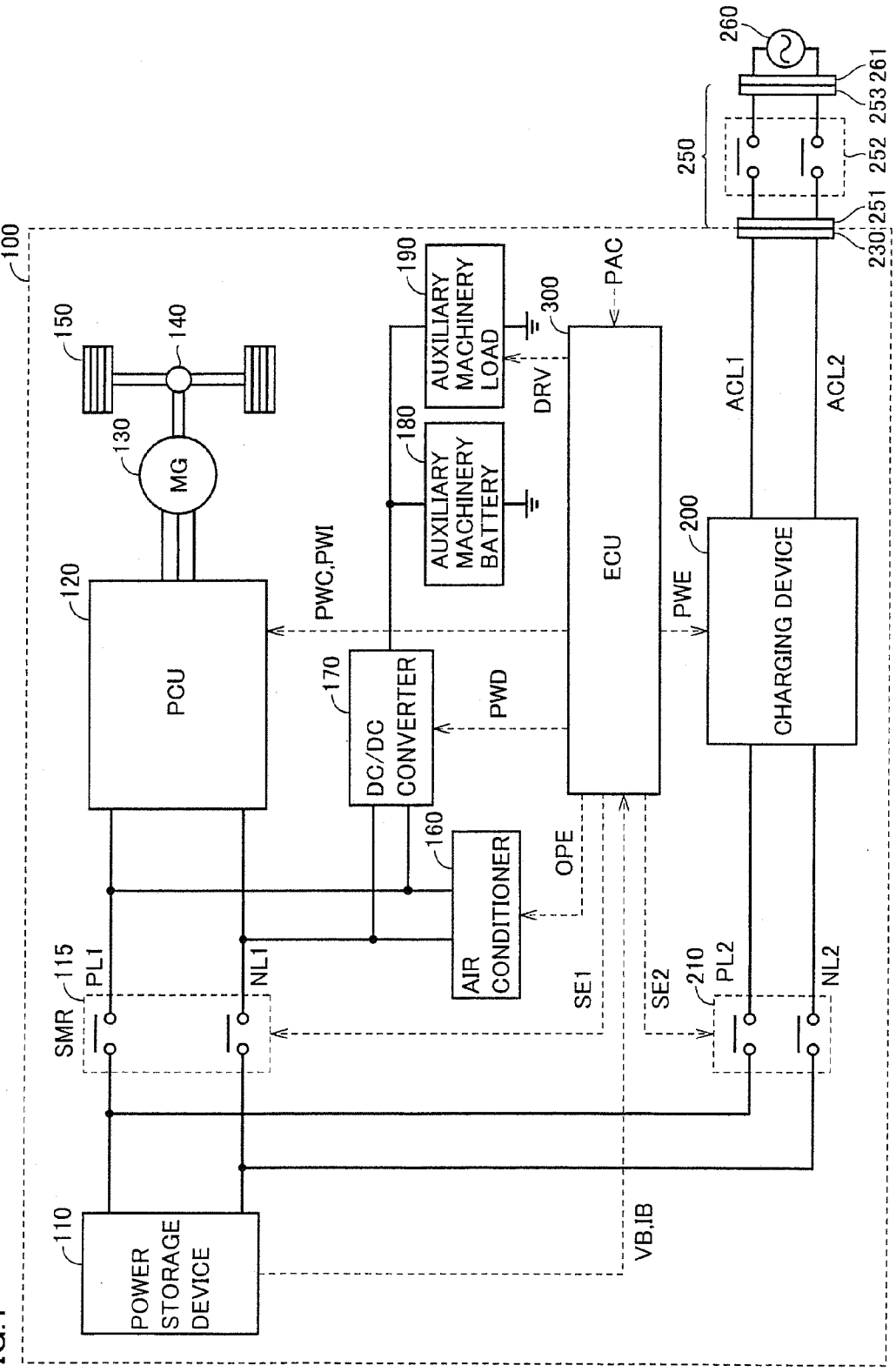
FIG. 1 is an overall block diagram of a vehicle equipped with a power supply system according to an embodiment of the present invention.

The embodiments of the present invention will be hereinafter described in detail with reference to the accompanying drawings, in which the same or corresponding components are designated by the same reference characters, and description thereof will not be repeated.

First Embodiment

FIG. 1 is an overall block diagram of a vehicle 100 equipped with a power supply system according to the embodiment of the present invention.

Referring to FIG. 1, vehicle 100 includes a power storage device 110, a system main relay (hereinafter also referred to as an SMR) 115, a PCU (Power Control Unit) 120 serving as a driving device, a motor generator 130, a power transmission gear 140, a driving wheel 150, and a control device (hereinafter also referred to as an ECU (Electronic Control Unit)) 300.

Power storage device 110 is a chargeable and dischargeable electric power storage element. Power storage device 110 is configured to include, for example, a secondary battery such as a lithium-ion battery, a nickel-metal hydride battery or a lead acid battery, or a power storage element such as an electric double layer capacitor.

Power storage device 110 is connected through SMR 115 to PCU 120 for driving motor generator 130. Power storage device 110 supplies the electric power to PCU 120 for generating the driving force for vehicle 100. Furthermore, power storage device 110 stores the electric power generated by motor generator 130. The output power of power storage device 110 is, for example, 200V.

The relays included in SMR 115 are inserted in power lines PL1 and NL1, respectively, which each connect power storage device 110 and PCU 120. Based on a control signal SE1 from ECU 300, SMR 115 switches between supply and interruption of the electric power between power storage device 110 and PCU 120.

Figure 2:
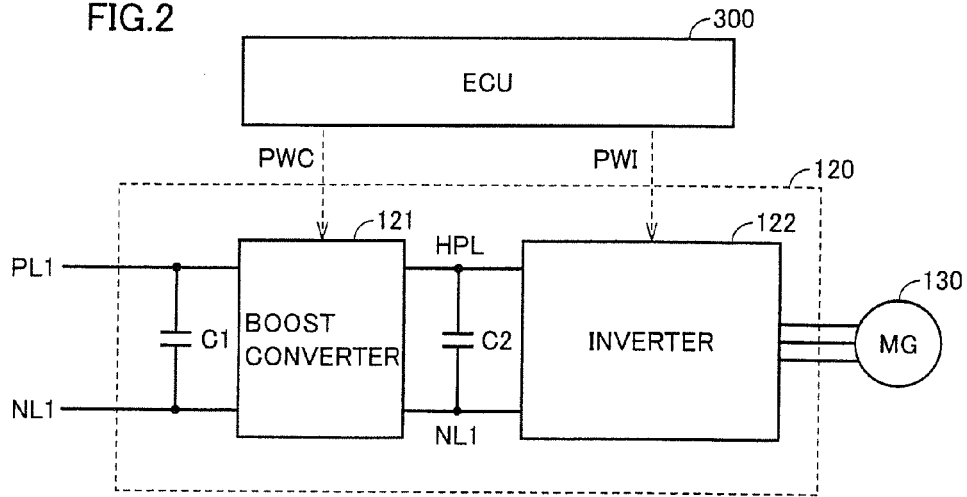
FIG. 2 is a diagram showing an example of an internal configuration of a PCU.

FIG. 2 is a diagram showing an example of the internal configuration of PCU 120.

Referring to FIG. 2, PCU 120 includes a converter 121, an inverter 122, and capacitors C1 and C2.

Based on a control signal PWC from ECU 300, converter 121 performs power conversion between power lines PL1, NL1 and power lines HPL, NL1.

Inverter 122 is connected to power lines HPL and NL1. Inverter 122 drives motor generator 130 based on a control signal PWI from ECU 300.

Capacitor C1 is provided between power lines PL1 and NL1, and reduces the voltage variation between power lines PL1 and NL1. Capacitor C2 is provided between power lines HPL and NL1, and reduces the voltage variation between power lines HPL and NL1.

Referring back to FIG. 1, motor generator 130 is an AC rotating electric machine, for example, a permanent magnet type synchronous electric motor provided with a rotor into which a permanent magnet is incorporated.

The output torque of motor generator 130 is transmitted to driving wheel 150 through power transmission gear 140 including a reduction gear and a power split device, for driving vehicle 100. Motor generator 130 can generate electric power by the rotating force of driving wheel 150 during the regenerative braking operation of vehicle 100. PCU 120 then converts the generated electric power into charge power for power storage device 110.

Furthermore, in the hybrid vehicle equipped with the engine (not shown) in addition to motor generator 130, this engine and motor generator 130 are cooperatively operated to generate the required vehicle driving force. In this case, power storage device 110 can also be charged using the electric power generated by the rotation of the engine.

In other words, vehicle 100 according to the present embodiment represents a vehicle provided with an electric motor for generating the vehicle driving force, and includes a hybrid vehicle generating the vehicle driving force by the engine and the electric motor, an electric vehicle and a fuel cell vehicle which are not equipped with an engine, and the like.

The vehicle power supply system is made up of components excluding motor generator 130, power transmission gear 140 and driving wheel 150 from the configuration of vehicle 100 which is shown in the figure.

The power supply system further includes an air conditioner 160, a DC/DC converter 170, an auxiliary machinery battery 180 and an auxiliary machinery load 190 as a configuration of the low voltage system (auxiliary machinery system).

Air conditioner 160 is connected to power lines PL1 and NL1. Air conditioner 160 is controlled by a control signal OPE output from ECU 300 based on a pre-air conditioning signal PAC, to air-condition the compartment in vehicle 100.

DC/DC converter 170 is connected to power lines PL1 and NL1, and performs voltage conversion of the direct-current (DC) voltage supplied from power storage device 110 based on a control signal PWD from ECU 300. DC/DC converter 170 then supplies the electric power to auxiliary machinery battery 180 and auxiliary machinery load 190.

Auxiliary machinery battery 180 typically includes a lead acid battery. The output voltage of auxiliary machinery battery 180 is lower than the output voltage of power storage device 110, for example, approximately 12V.

Auxiliary machinery load 190 includes, for example, a variety of lamps, a wiper, a heater, an audio unit, a navigation system, and the like. Auxiliary machinery load 190 is operated based on a control signal DRV from ECU 300.

ECU 300 including a CPU (Central Processing Unit), a storage device and an input and output buffer which are not shown in FIG. 1 receives a signal from each sensor and the like and outputs a control signal to each device, and also controls vehicle 100 and each device. It is to be noted that the above-described control is not limited to the process by software but can be carried out by dedicated hardware (an electronic circuit).

ECU 300 receives detected values of a voltage VB and a current IB of power storage device 110 which are detected by the voltage sensor and the current sensor which are not shown in the figure but included in power storage device 110. Based on these values, ECU 300 calculates a state of charge (hereinafter also referred to as an SOC), and charge and discharge power upper limit values Win and Wout of the power storage device.

ECU 300 generates and outputs a control signal used for driving PCU 120, DC/DC converter 170, air conditioner 160, auxiliary machinery load 190, and the like. ECU 300 also outputs control signal SE1 for controlling SMR 115.

The power supply system includes a connecting port 230, a charging device 200 and a relay 210 as a configuration for charging power storage device 110 with the electric power from an external power supply 260.

A charging connector 251 of a charging cable 250 is connected to connecting port 230. The electric power from external power supply 260 is transmitted to vehicle 100 through charging cable 250.

In addition to charging connector 251, charging cable 250 includes a power supply plug 253 for connecting to an outlet 261 of external power supply 260 and a relay 252 for switching between supply and interruption of the electric power from external power supply 260. It is to be noted that relay 252 is not necessarily required and charging cable 250 may not include relay 252.

Relay 210 is inserted in power lines PL2 and NL2 each connecting power storage device 110 and charging device 200. Based on a control signal SE2 from ECU 300, relay 210 switches between supply and interruption of the electric power between power storage device 110 and charging device 200.

Charging device 200 is connected to connecting port 230 via power lines ACL1 and ACL2. Furthermore, charging device 200 is connected through relay 210 to power storage device 110. Charging device 200 converts the AC power supplied from external power supply 260 into a DC power which can be stored in power storage device 110.

During the vehicle running, air conditioner 160 in FIG. 1 is driven with the electric power from power storage device 110. Furthermore, during the external charging, air conditioner 160 uses the electric power from power storage device 110 and/or the electric power from the external power supply which is converted by charging device 200, to perform pre-air conditioning for air-conditioning the compartment in the vehicle while the vehicle is stopped.

Figure 3:
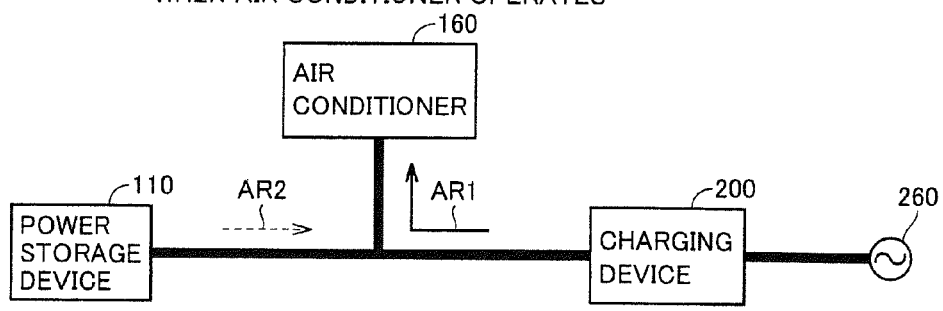
FIG. 3 is a diagram showing the flow of the electric power in the case where an air conditioner is operated during external charging.
Figure 4:
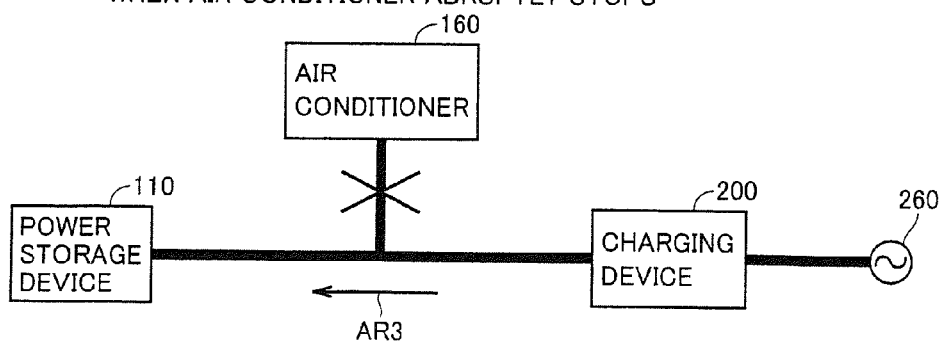
FIG. 4 is a diagram showing the flow of the electric power in the case where the air conditioner abruptly stops during pre-air conditioning.

Referring to FIGS. 3 and 4, the problems associated with pre-air conditioning during the external charging will then be described.

FIG. 3 is a diagram showing the flow of the electric power in the case where air conditioner 160 is operated during external charging.

Referring to FIG. 3, the pre-air conditioning operation during external charging is generally performed after completion of charging of power storage device 110. Therefore, during the pre-air conditioning, the electric power for driving air conditioner 160 is supplied mainly from charging device 200 as shown by an arrow AR1 in FIG. 3.

In order to prevent power storage device 110 from being charged during pre-air conditioning which results from errors and the like of the sensor (not shown) for detecting the voltage and the current of power storage device 110, a small amount of electric power may be supplied from power storage device 110 as shown by an arrow AR2 in the figure.

Furthermore, the pre-air conditioning may take place concurrently with charging of power storage device 110, in which case the electric power from charging device 200 is supplied to power storage device 110 and air conditioner 160.

FIG. 4 is a diagram showing the flow of the electric power in the case where air conditioner 160 abruptly stops during the pre-air conditioning. Air conditioner 160 may be intermittently operated in order to keep the target temperature in the compartment in the vehicle, and may also be stopped at the time when the temperature in the compartment reaches a predetermined target temperature.

Referring to FIG. 4, when air conditioner 160 is stopped in the case where charging of power storage device 110 is completed, charging device 200 is no longer required to supply the electric power if there is no other device consuming electric power. Accordingly, the electric power output from charging device 200 is decreased in response to discontinuation of the operation of air conditioner 160.

However, when air conditioner 160 abruptly stops, a delay in decreasing the output electric power occurs in charging device 200. Therefore, the electric power output during the transition period until charging device 200 stops is supplied to power storage device 110. Power storage device 110 is further charged with this electric power.

When air conditioner 160 continues to repeatedly operate and stop for a long period of time, the SOC of power storage device 110 gradually increases. Consequently, the SOC may exceed the upper limit value above which charging of power storage device 110 is not allowed, which may lead to overcharging.

Recently, a lithium ion battery is sometimes employed as power storage device 110. In general, continuous overcharging of this lithium ion battery for a long period of time may cause oxygen release resulting from dissolution of the positive electrode and deposition of metallic lithium on the negative electrode, which may lead to failure or deterioration of the battery. Therefore, particularly when a lithium ion battery is employed, there is a need to more strictly prevent overcharging.

Thus, according to the present embodiment, the overcharge prevention control is carried out in the pre-air conditioning during external charging, in order to prevent overcharging of power storage device 110 resulting from the intermittent operation of air conditioner 160.

Figure 5:
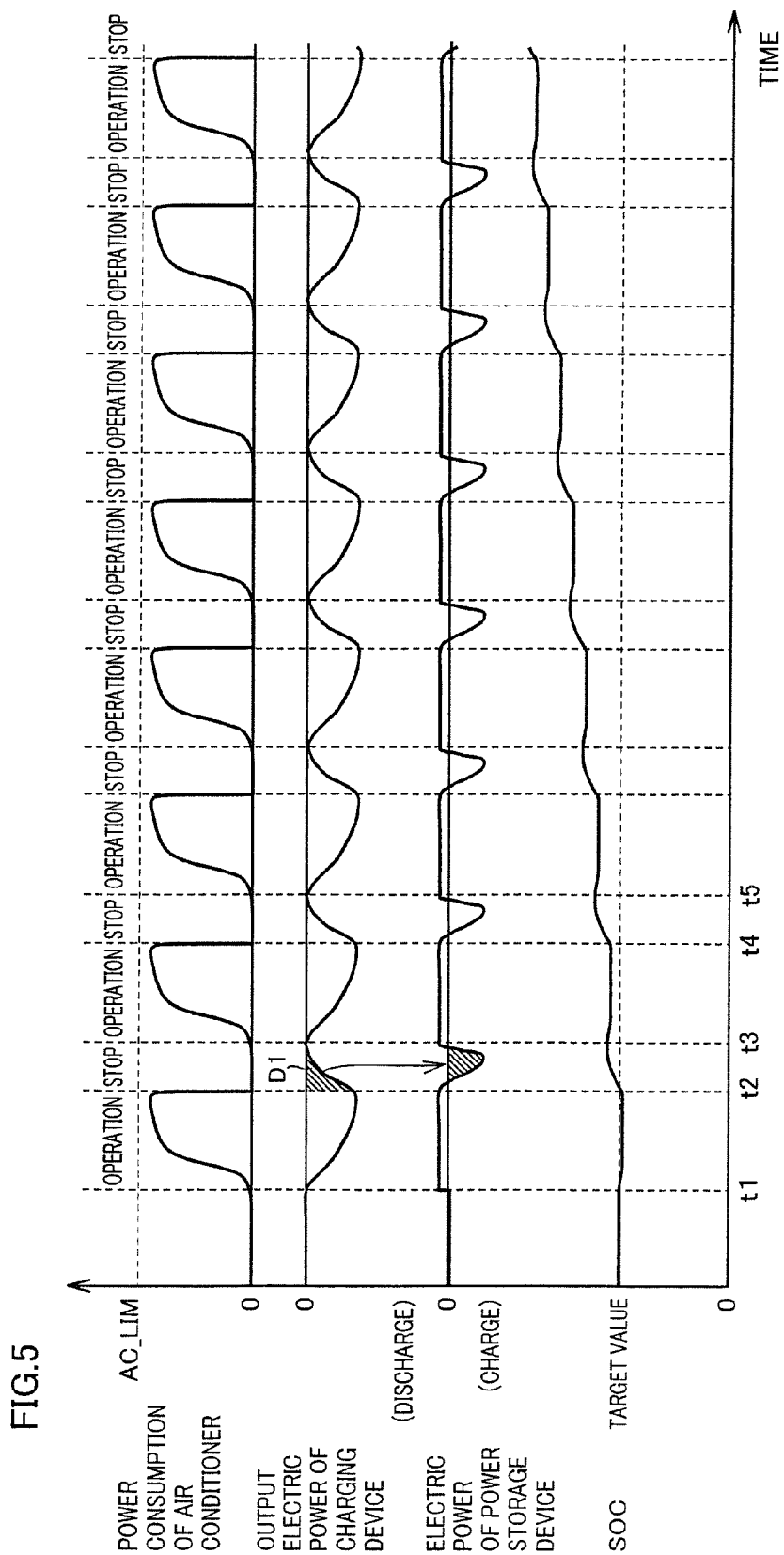
FIG. 5 is a diagram for illustrating the change in an SOC in the comparative example in which overcharge prevention control is not applied.
Figure 6:
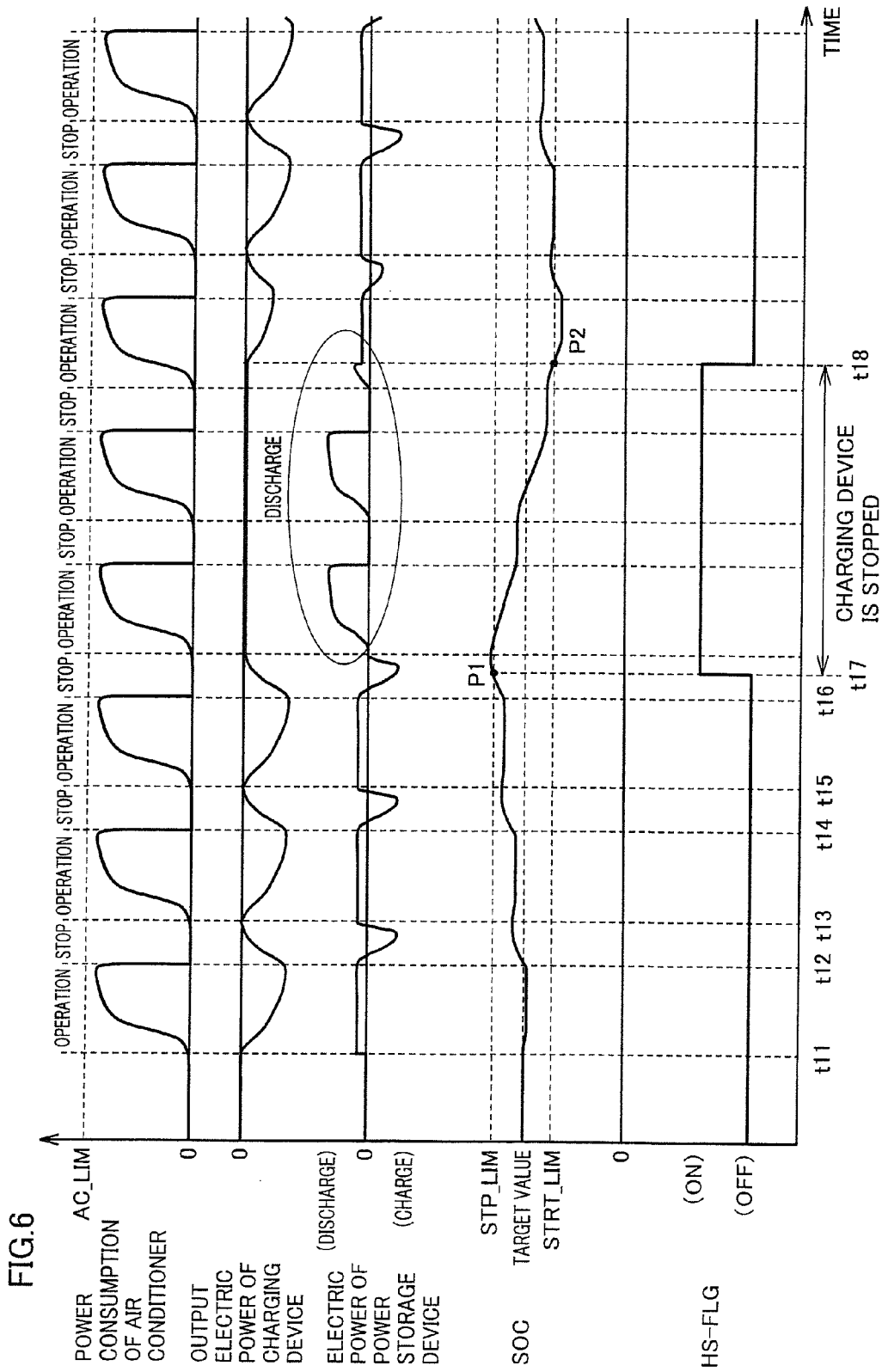
FIG. 6 is a diagram for illustrating the change in the SOC in the case where the overcharge prevention control according to the first embodiment is applied.

Referring to FIGS. 5 and 6, an overview of the overcharge prevention control according to the present embodiment will then be described.

FIG. 5 is a diagram for illustrating the change in the SOC in the comparative example in which overcharge prevention control is not applied. In FIG. 5, the horizontal axis represents time, and the vertical axis represents the electric power consumed by air conditioner 160, the electric power output from charging device 200, the electric power of power storage device 110, and the SOC of power storage device 110. In addition, in FIGS. 5, 6 and 10 which is described later, the electric power in the direction in which the electric power is discharged from power storage device 110 is represented as positive, and the electric power in the direction in which the electric power is supplied to power storage device 110 is represented as negative.

Referring to FIG. 5, assume that pre-air conditioning of air conditioner 160 is started after the SOC of power storage device 110 reaches the target value. Air conditioner 160 remains stopped until a time t1.

At time t1, the operation of air conditioner 160 is started, for example, in response to the activation command from the operator and the activation command by the timer which is set in advance. This causes an increase in the electric power output from charging device 200. Furthermore, power storage device 110 also discharges a small amount of electric power in order to prevent charging caused by errors of the sensor, and the like, as described above.

Then, at a time t2, for example, as the temperature in the compartment in the vehicle reaches the target temperature, air conditioner 160 is stopped. This causes discharging from power storage device 110 to be stopped and the output of the electric power from charging device 200 to be also stopped. However, since air conditioner 160 starts and stops the operation independently of the control of charging device 200, charging device 200 starts to decrease the output electric power after detecting that air conditioner 160 is stopped. Accordingly, even after air conditioner 160 is stopped, charging device 200 continuously outputs the electric power as shown at D1 in FIG. 5 during the transient period.

The electric power output during the transient period in this way is not consumed by air conditioner 160, but used as charge power for power storage device 110. This causes the electric power of power storage device 110 to be increased toward the charging side (negative side) as shown in the period between times t2 and t3. Consequently, the SOC of power storage device 110 is increased.

At time t3, when the temperature in the compartment in the vehicle is raised and the operation of air conditioner 160 is resumed, charging device 200 and power storage device 110 output the electric power as in the period between times t1 to t2. Then, when air conditioner 160 is stopped at a time t4, the electric power output from charging device 200 is supplied to power storage device 110 to causes a further increase in the SOC in the period between times t4 and t5.

In this way, the intermittent operation of air conditioner 160 causes a gradual increase in the SOC. As a result, when the intermittent operation of air conditioner 160 as described above is continued for a long period of time, the SOC of power storage device 110 may exceed the upper limit value above which charging is not allowed, to thereby cause overcharging.

Furthermore, the charge target value can also be set in consideration of this increase in the SOC in advance. However, in this case, the charge target value is set to a lower value, which leads to a decreased SOC in the fully charged state. This results in a decrease in the distance between which the vehicles runs with the electric power of power storage device 110 without using the engine, that is, the distance between which the vehicle can run in the so-called EV running mode.

FIG. 6 is a diagram for illustrating the change in the SOC in the case where the overcharge prevention control according to the first embodiment is applied. FIG. 6 shows the diagram as shown in FIG. 5, which additionally includes a high SOC flag HS-FLG along the vertical axis.

Referring to FIG. 6, pre-air conditioning is started at a time t11 as in the case of FIG. 5. Then, the intermittent operation of air conditioner 160 causes a gradual increase in the SOC in the period between t11 and t15 in the figure.

Then, air conditioner 160 is stopped at a time t16 to cause a further increase in the SOC. At a time t17, the SOC of power storage device 110 exceeds a threshold value STP_LIM used for restricting driving of charging device 200 (a point P1 in FIG. 6). Accordingly, high SOC flag HS-FLG is set to be ON.

While high SOC flag HS-FLG is set to be ON, charging device 200 is not driven even when the operation of air conditioner 160 is started. Therefore, air conditioner 160 is driven using the electric power from power storage device 110. Consequently, the discharge power of power storage device 110 is increased and the SOC of power storage device 110 is decreased.

Then, at a time t18, the SOC of power storage device 110 is decreased below a threshold value STRT_LIM at which the restriction on driving of charging device 200 (a point P2 in FIG. 6) is removed, and high SOC flag HS-FLG is set to be OFF accordingly.

Consequently, the operation of charging device 200 is resumed and air conditioner 160 is driven using the electric power from charging device 200.

Repetitions of the above-described control allow the SOC to be maintained near and between threshold values STP_LIM and STRT_LIM even if air conditioner 160 is intermittently operated in the pre-air conditioning operation during external charging. Accordingly, overcharging of power storage device 110 can be prevented.

In addition, although threshold value STRT_LIM, at which the restriction on driving of charging device 200 is removed, is set to be smaller than the charge target value in FIG. 6, this charge target value may be set as a threshold value STRT_LIM. Since this allows the targeted SOC to be ensured at the minimum, a reduction in the distance between which the vehicle can run in the EV running mode can be prevented.

Figure 7:
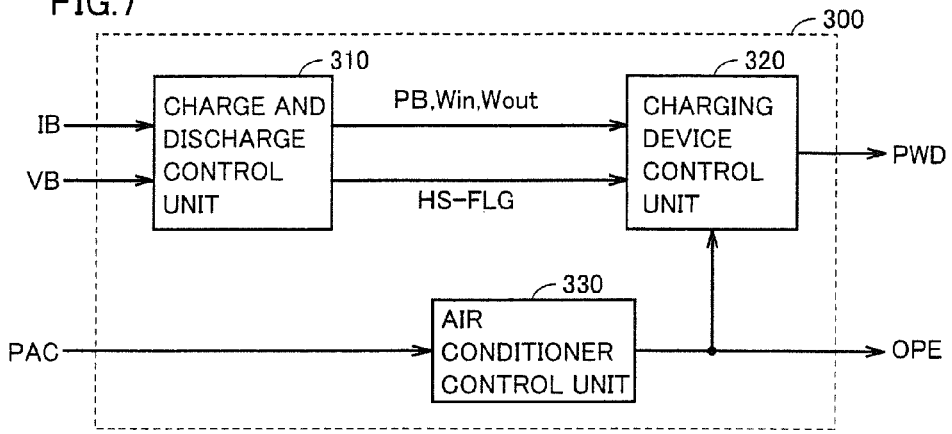
FIG. 7 is a functional block diagram for illustrating the overcharge prevention control performed in the ECU in the first embodiment.

FIG. 7 is a functional block diagram for illustrating the overcharge prevention control performed in ECU 300 in the first embodiment.

Referring to FIG. 7, ECU 300 includes a charge and discharge control unit 310, a charging device control unit 320 and an air conditioner control unit 330.

Charge and discharge control unit 310 receives detected values of voltage VB and current IB from power storage device 110. Based on these detected values, charge and discharge control unit 310 calculates the SOC and charge and discharge power upper limit values Win and Wout of power storage device 110. Charge and discharge control unit 310 also calculates an input and output electric power PB of power storage device 110 based on the detected values of voltage VB and current IB. Furthermore, charge and discharge control unit 310 compares the calculated SOC with the threshold value to set a high SOC flag HS-FLG.

Then, charge and discharge control unit 310 outputs input and output electric power PB, charge and discharge power upper limit values Win and Wout, and high SOC flag HS-FLG to charging device control unit 320.

Based on the input of the pre-air conditioning signal, air conditioner control unit 330 generates control signal OPE used for controlling air conditioner 160 and outputs the signal to air conditioner 160. Air conditioner control unit 330 also outputs control signal OPE to charging device control unit 320.

Charging device control unit 320 receives input and output electric power PB, charge and discharge power upper limit values Win and Wout and high SOC flag HS-FLG from charge and discharge control unit 310, and control signal OPE from air conditioner control unit 330. Based on such information, charging device control unit 320 calculates an upper limit value Win_chgf and a lower limit value Wout_chgf of the electric power output from charging device 200. Charging device control unit 320 then sets a command value such that the electric power output from charging device 200 ranges between the upper limit value and the lower limit value. Based on the command value, charging device control unit 320 generates a control signal PWE used for driving charging device 200 and outputs the signal to charging device 200.

Figure 8:
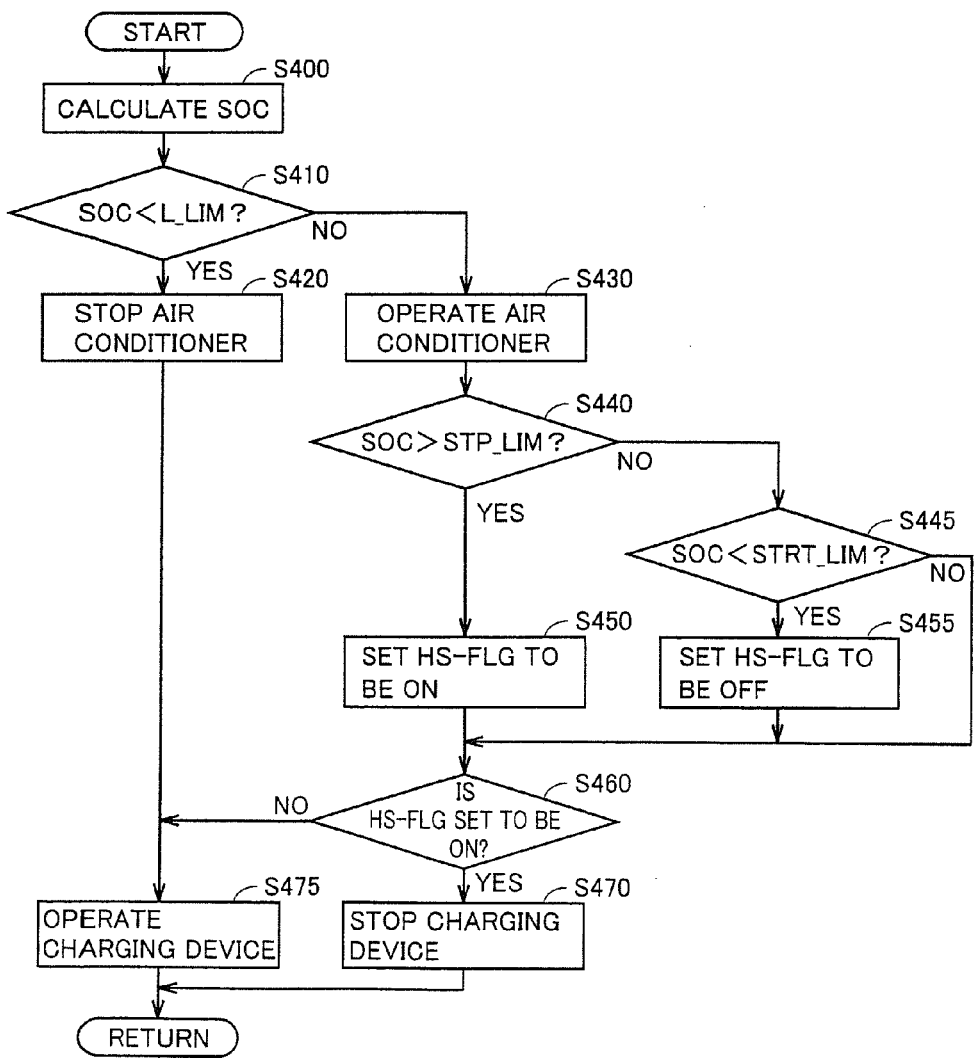
FIG. 8 is a flowchart for illustrating the details of the overcharge prevention control process performed in the ECU in the first embodiment.
Figure 9:
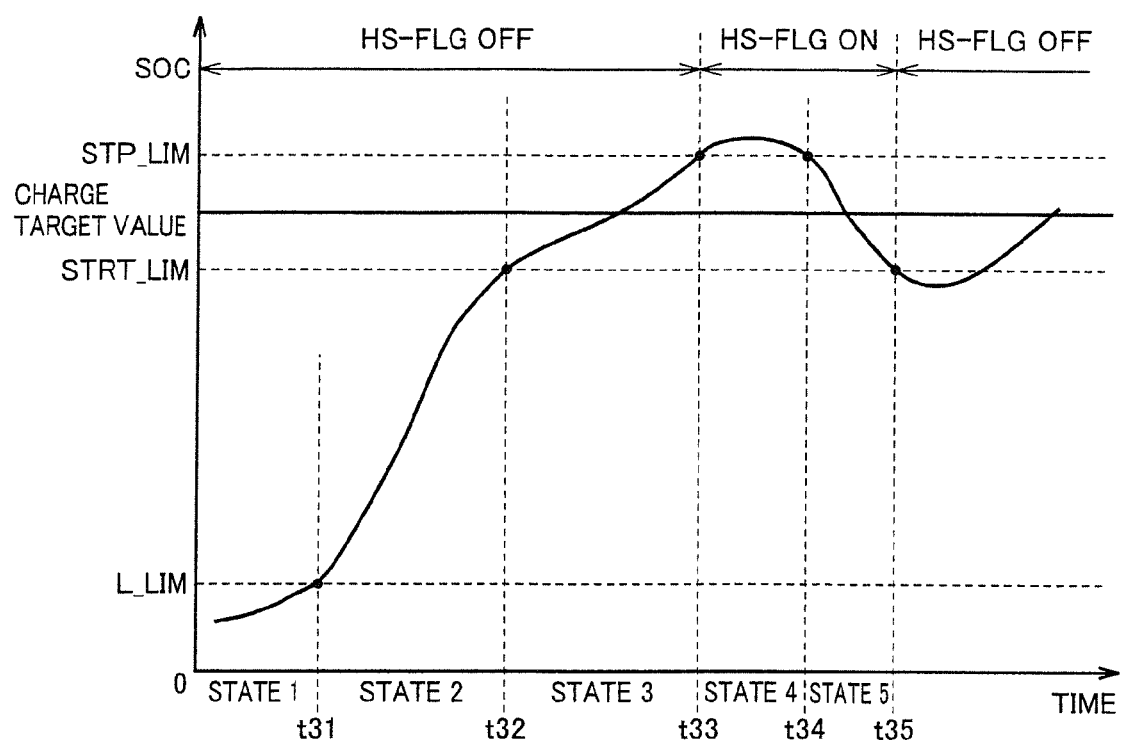
FIG. 9 is a diagram showing the state of a high SOC flag corresponding to the change in the SOC of the power storage device.

Referring to FIGS. 8 and 9, the details of the overcharge prevention control process performed in ECU 300 will then be described.

FIG. 8 is a flowchart for illustrating the details of the overcharge prevention control process performed in ECU 300 in the first embodiment. Each step in the flowcharts shown in FIG. 8 and FIGS. 12 and 15 described later is implemented by executing the program stored in advance in ECU 300 in predetermined cycles. Alternatively, in some of the steps, the process can be implemented by dedicated hardware (an electronic circuit).

FIG. 9 is a diagram showing the state of high SOC flag HS-FLG corresponding to the change in the SOC of power storage device 110.

The flowchart in FIG. 8 will be described in accordance with the change in the state of the SOC shown in FIG. 9.

Referring to FIGS. 8 and 9, in step (hereinafter abbreviated as S) 400, when receiving an input of pre-air conditioning signal PAC, ECU 300 calculates the SOC based on voltage VB and current IB supplied from power storage device 110.

Then, in S410, ECU 300 determines whether the calculated SOC is smaller than a threshold value L_LIM. Threshold value L_LIM is used for determining whether power storage device 110 can output the electric power when air conditioner 160 is operated in the pre-air conditioning operation.

The state where the SOC is smaller than threshold value L_LIM (YES in S410) corresponds to a state 1 prior to a time t31 in FIG. 9. In this case, the electric power output to air conditioner 160 is insufficient in pre-air conditioning, and thus, ECU 300 determines that air conditioner 160 cannot be operated. Therefore, ECU 300 stops the operation of air conditioner 160 in S420. The process then proceeds to S475 in which ECU 300 causes charging device 200 to operate. Then, the process is returned to the main routine. Thus, power storage device 110 is charged to increase the SOC.

On the other hand, when the SOC is greater than threshold value L_LIM (NO in S410), air conditioner 160 can be operated. Accordingly, the process proceeds to S430 in which ECU 300 causes air conditioner 160 to operate.

Then, the process proceeds to S440, in which ECU 300 determines whether the SOC is greater than threshold value STP_LIM used for restricting driving of charging device 200.

In states 2 and 3 in FIG. 9, the SOC is less than or equal to threshold value STP_LIM. Accordingly, NO is selected in S440 and the process proceeds to S445.

In S445, ECU 300 determines whether the SOC is smaller than threshold value STRT_LIM used for resuming driving of charging device 200.

In state 2 in FIG. 9, since the SOC is smaller than threshold value STRT_LIM, YES is selected in S445 and the process proceeds to S455. In S455, ECU 300 sets high SOC flag HS-FLG to be OFF.

Then, the process proceeds to S460 in which ECU 300 determines whether high SOC flag HS-FLG is set to be ON.

In state 2 in FIG. 9, since high SOC flag HS-FLG is OFF, NO is selected in S460 and the process proceeds to S475 in which ECU 300 causes charging device 200 to operate. Then, the process is returned to the main routine.

On the other hand, in state 3 in FIG. 9, since the SOC is greater than or equal to threshold value STRT_LIM, NO is selected in S445. In this case, high SOC flag HS-FLG is maintained in the current state. In state 3, since high SOC flag HS-FLG is OFF before a time t32, high SOC flag HS-FLG is maintained in the OFF state.

The process then proceeds to S460 in which NO is selected as in state 2, and then, charging device 200 is operated (S475).

At a time t33 in FIG. 9, the SOC is greater than threshold value STP_LIM. Accordingly, in a state 4, YES is selected in S440 and the process proceeds to S450 in which ECU 300 sets high SOC flag HS-FLG to be ON.

Then, YES is selected in S460 and ECU 300 causes charging device 200 to be stopped in S470.

Since charging device 200 is stopped, air conditioner 160 consumes the electric power of power storage device 110, which causes a gradual decrease in the SOC. Then, the SOC is less than or equal to threshold value STP_LIM at a time t34 in FIG. 9 (NO in S440), but greater than or equal to threshold value STRT_LIM at a state 5 (NO in S445). Accordingly, high SOC flag HS-FLG is maintained in the ON state and the process proceeds to S460. Then, charging device 200 is kept stopped (S470).

Then, the SOC further decreases to fall below threshold value STRT_LIM at a time t35 in FIG. 9. This brings about the same state as state 2. Accordingly, NO is selected in S440 and YES is selected in S445. Then, ECU 300 sets high SOC flag HS-FLG to be OFF. Consequently, NO is selected in S460 to resume the operation of charging device 200 (S475).

Since a series of states 2 to 5 is repeated at time t35 or later, the SOC is maintained in the vicinity of the charge target value.

The control perforated in accordance with the above-described processes can prevent overcharging of power storage device 110 in the pre-air conditioning during external charging.

Modification of First Embodiment

In the first embodiment as described above, the description has been made with regard to the configuration for preventing overcharging of power storage device 110 by causing charging device 200 to stop while high SOC flag HS-FLG is ON.

In the modification of the first embodiment, the description will be made with regard to the configuration for preventing overcharging by, instead of causing charging device 200 to stop, causing auxiliary machinery load 190 along with air conditioner 160 to consume the electric power stored in power storage device 110 while high SOC flag HS-FLG is ON.

Figure 10:
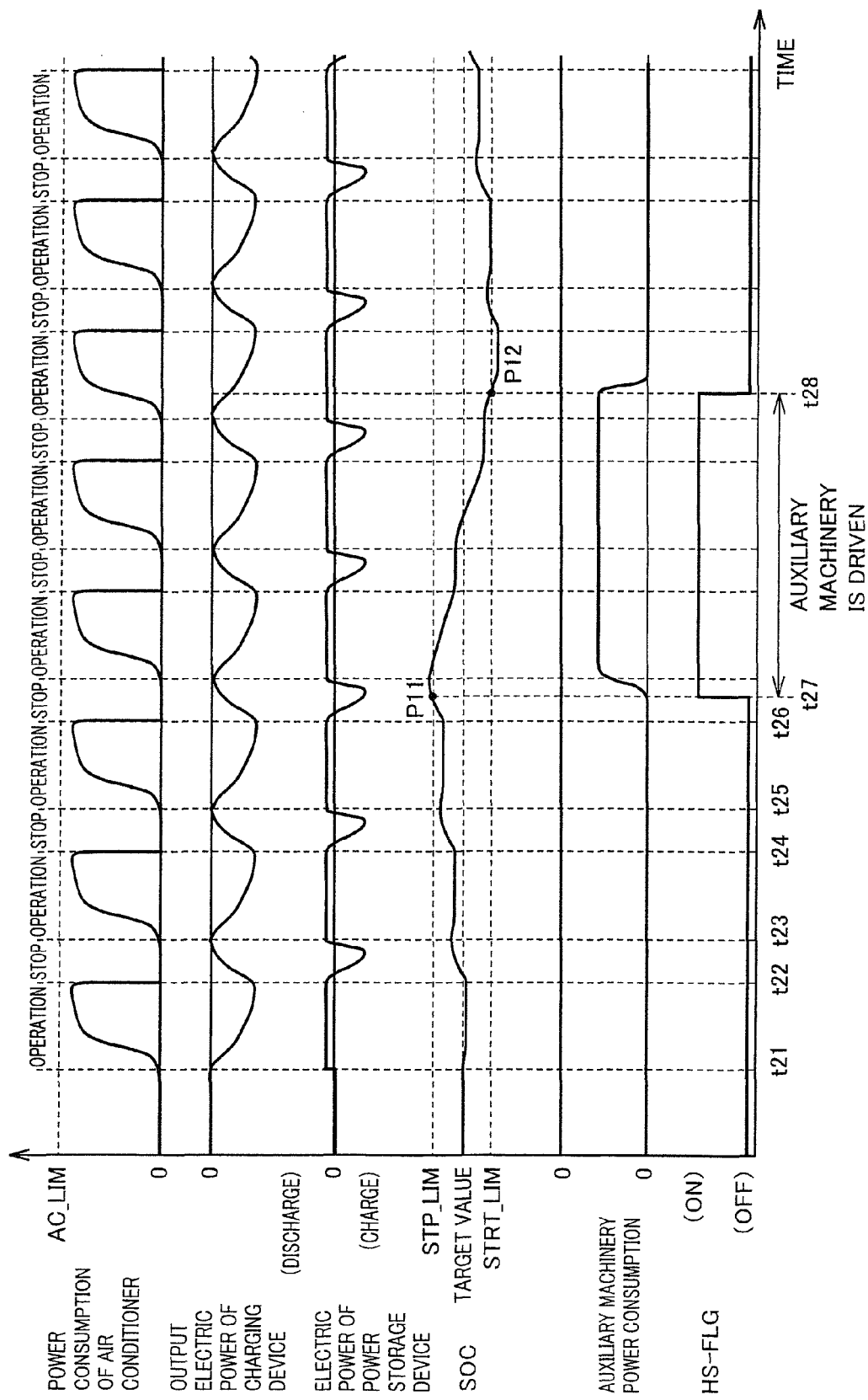
FIG. 10 is a diagram for illustrating the change in the SOC in the case where the overcharge prevention control in the modification of the first embodiment is applied.

FIG. 10 is a diagram for illustrating the change in the SOC in the case where the overcharge prevention control in the modification of the first embodiment is applied. FIG. 10 shows the same diagram as that in FIG. 6 described in the first embodiment other than power consumption of auxiliary machinery load 190 which is additionally provided.

Referring to FIG. 10, the graphs until a time t26 show the same conditions as those until a time t16 in FIG. 6, in which the intermittent operation of air conditioner 160 in the pre-air conditioning causes a gradual increase in the SOC.

At a time t27, the SOC is greater than threshold value STP_LIM (a point P11 in FIG. 10) and high SOC flag HS-FLG is set to be ON.

Accordingly, auxiliary machinery load 190 consumes the electric power while charging device 200 is kept operated. In this case, it is suitable to employ auxiliary machinery load 190, for example, such as a sheet heater or a defroster which consumes a large amount of electric power for generating heat and the like without motion.

When auxiliary machinery load 190 consumes the electric power to decrease the SOC of power storage device 110 below threshold value STRT_LIM at a time t28 (a point P12 in FIG. 10), high SOC flag HS-FLG is set to be OFF to cause auxiliary machinery load 190 to stop consuming the electric power. Consequently, the decrease of the SOC is stopped.

The above-described configuration can also prevent overcharging of power storage device 110 in the pre-air conditioning during external charging.

Figure 11:
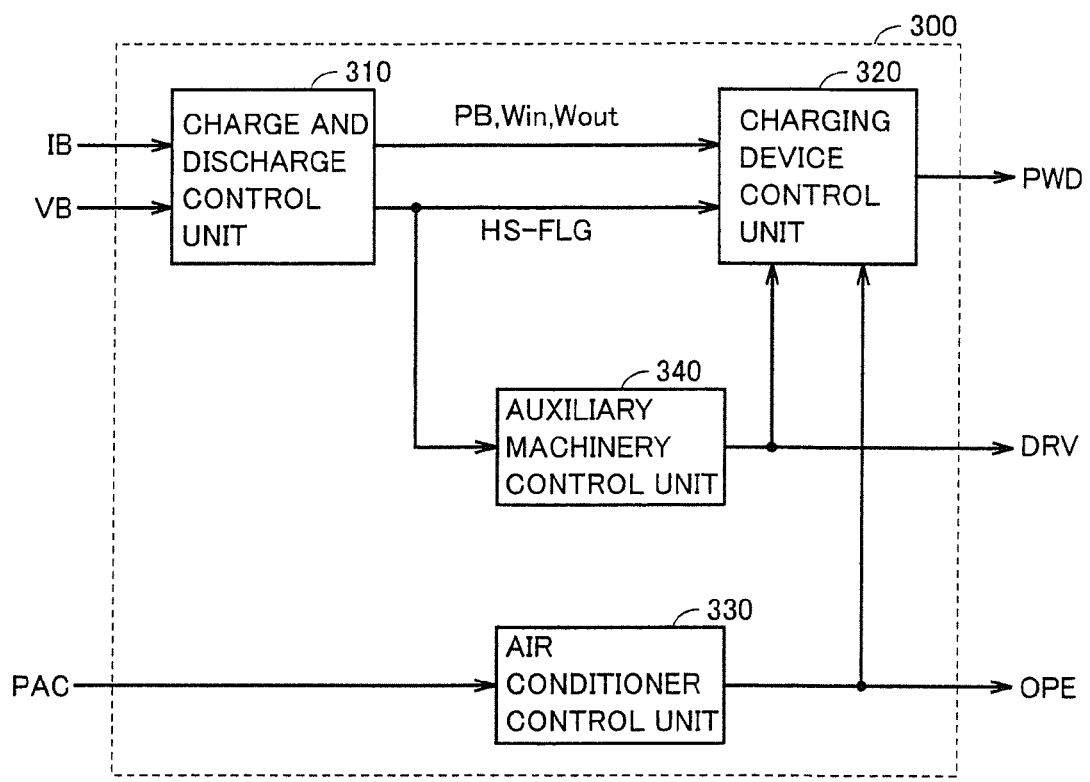
FIG. 11 is a functional block diagram for illustrating the overcharge prevention control performed in the ECU in the modification of the first embodiment.

FIG. 11 is a functional block diagram for illustrating the overcharge prevention control performed in ECU 300 in the modification of the first embodiment. FIG. 11 shows the same functional block diagram as that in FIG. 7 in the first embodiment other than an auxiliary machinery control unit 340 which is additionally provided. In FIG. 11, the description of the functional blocks overlapping with those in FIG. 7 will not be repeated.

Referring to FIG. 11, auxiliary machinery control unit 340 receives high SOC flag HS-FLG from charge and discharge control unit 310. When this high SOC flag HS-FLG is set to be ON, auxiliary machinery control unit 340 outputs control signal DRV to auxiliary machinery load 190 to causes auxiliary machinery load 190 to start consuming the electric power from charging device 200 and power storage device 110.

Furthermore, auxiliary machinery control unit 340 outputs control signal DRV to charging device control unit 320.

Charging device control unit 320 receives input and output electric power PB, charge and discharge power upper limit values Win and Wout and high SOC flag HS-FLG from charge and discharge control unit 310, control signal OPE from air conditioner control unit 330, and control signal DRV from auxiliary machinery control unit 340. Based on such information, charging device control unit 320 calculates upper limit value Win_chgf and lower limit value Wout_chgf of the electric power output from charging device 200. Charging device control unit 320 then sets a command value such that the electric power output from charging device 200 ranges between the upper limit value and the lower limit value. Based on the command value, charging device control unit 320 generates control signal PWE used for driving charging device 200 and outputs the signal to charging device 200.

Figure 12:
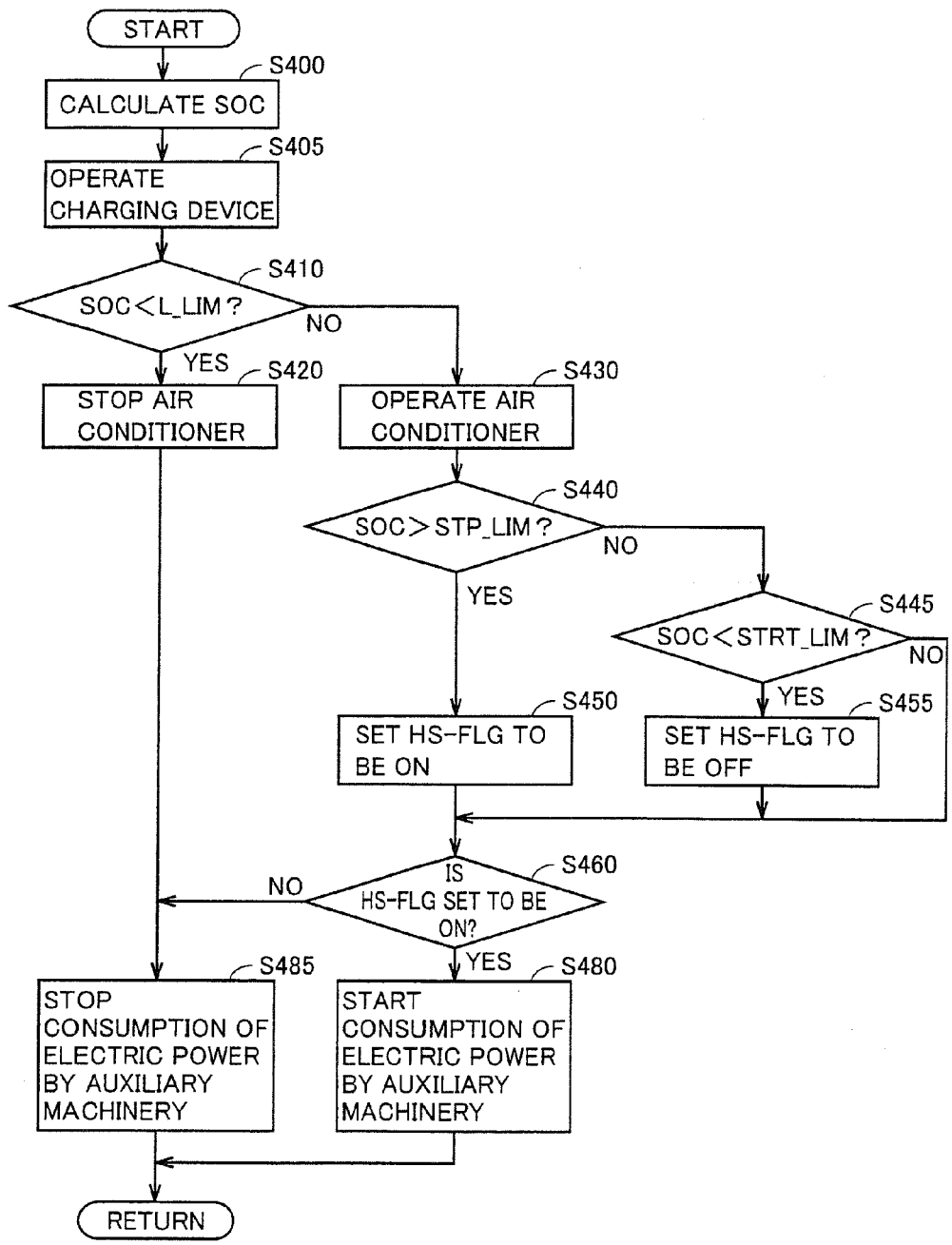
FIG. 12 is a flowchart for illustrating the details of the overcharge prevention control process performed in the ECU in the modification of the first embodiment.

FIG. 12 is a flowchart for illustrating the details of the overcharge prevention control process performed in ECU 300 in the modification of the first embodiment. In FIG. 12, step S405 is added to the flowchart in FIG. 8 of the first embodiment, and S470 and S475 are replaced with S480 and S485, respectively. The description of the steps overlapping with those in FIG. 8 will not be repeated in FIG. 12.

Referring to FIG. 12, when receiving an input of pre-air conditioning signal PAC, ECU 300 calculates the SOC of power storage device 110 in S400 and causes charging device 200 to operate in S405.

In S410, ECU 300 determines whether the calculated SOC is smaller than threshold value L_LIM.

When the SOC is smaller than threshold value L_LIM (YES in S410), ECU 300 causes the air conditioner to stop (S420) and causes auxiliary machinery load 190 to stop consuming the electric power (S485). Consequently, power storage device 110 is charged until the SOC reaches the level at which pre-air conditioning is allowed.

On the other hand, when the SOC is greater than or equal to threshold value L_LIM (NO in S410), ECU 300 causes the air conditioner to operate (S430) and sets high SOC flag HS-FLG by the processes in S440 to S455 as in FIG. 8.

In S460, ECU 300 determines whether high SOC flag HS-FLG is set to be ON.

When high SOC flag HS-FLG is set to be ON (YES in S460), the process proceeds to S480 in which ECU 300 causes auxiliary machinery load 190 to consume the electric power stored in power storage device 110. Consequently, the SOC is decreased.

On the other hand, when high SOC flag HS-FLG is set to be OFF (NO in S460), the electric power stored in power storage device 110 does not need to be consumed. Accordingly, ECU 300 causes auxiliary machinery load 190 to stop consuming the electric power (S485).

The control performed in accordance with the above-described processes allows auxiliary machinery load 190 to consume the electric power supplied to power storage device 110 by the intermittent operation of air conditioner 160 in the pre-air conditioning during the external charging. Accordingly, overcharging of power storage device 110 can be prevented.

It is to be noted that the control for charging device 200 according to the first embodiment may be used in combination with the control for auxiliary machinery load 190 according to the modification of the first embodiment.

Second Embodiment

In the first embodiment, the description has been made with regard to the configuration in which charging device 200 is stopped while high SOC flag HS-FLG is set to be ON.

However, when the electric power from power storage device 110 is used to drive air conditioner 160, the electric power consumed by air conditioner 160 is sometimes greatly increased, for example, for some reasons to exceed discharge power upper limit value Wout of power storage device 110. In this case, the electric power required by air conditioner 160 may not be fully supplied or overdischarging of power storage device 110 may be caused.

Thus, in the second embodiment, the description will be made with regard to the configuration for, in addition to the overcharge prevention control described in the first embodiment, controlling charging device 200 to operate to supply a deficient amount of electric power when the consumed electric power exceeds discharge power upper limit value Wout of power storage device 110 even in the case where high SOC flag HS-FLG is set to be ON.

Figure 13:
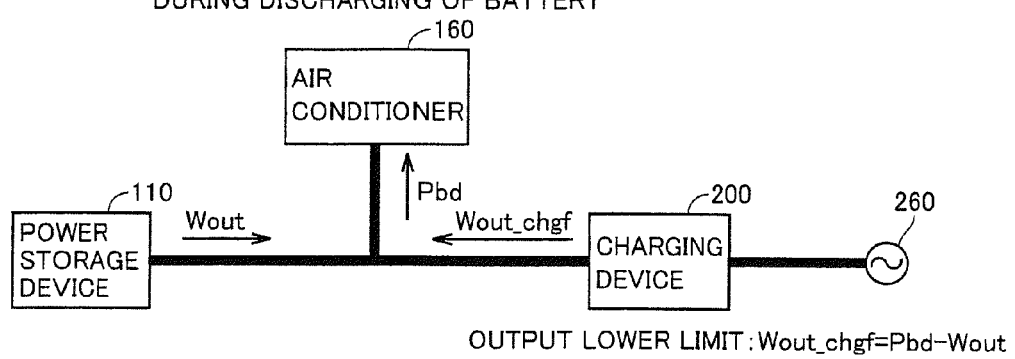
FIG. 13 is a diagram for illustrating the lower limit value of the electric power output from the charging device at the time when the power storage device is discharged.
Figure 14:
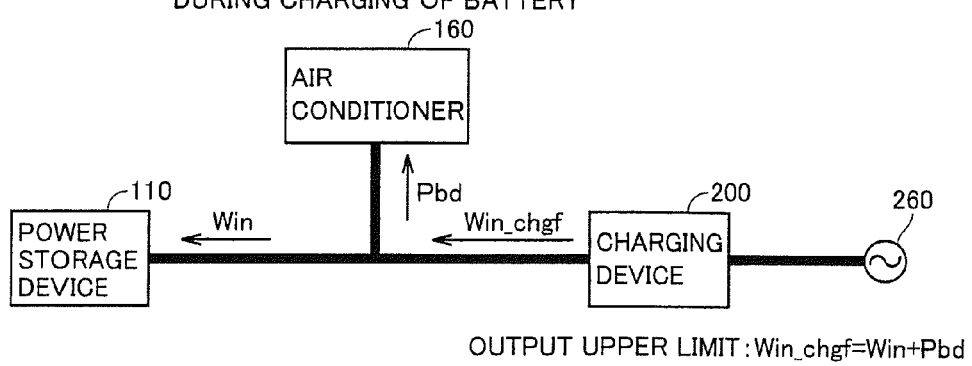
FIG. 14 is a diagram for illustrating the upper limit value of the electric power output from the charging device at the time when the power storage device is charged.

FIGS. 13 and 14 each are a diagram for illustrating the lower and upper limit values, respectively, of the electric power output from charging device 200 when power storage device 110 is discharged and charged, respectively. FIG. 13 shows the case where power storage device 110 is discharged, and FIG. 14 shows the case where power storage device 110 is charged. In FIGS. 13 and 14, the description will be made with respect to the case where the discharge power and the charge power of power storage device 110 correspond to discharge and charge power upper limit values, respectively.

Referring to FIG. 13, assume that the driving electric power required for driving air conditioner 160 at a certain point of time is represented as Pbd. When discharged from power storage device 110, this driving electric power Pbd is supplied from power storage device 110 and charging device 200.

As shown in FIG. 13, in the state where power storage device 110 outputs the electric power at which discharging is allowed in the above-described state, that is, the electric power corresponding to discharge power upper limit value Wout, the electric power output from charging device 200 at this time is assumed to be Wout_chgf, which can be represented by the following equation (1).

$$Pbd = Wout + Wout\_chgf \quad (1)$$

Based on the above, the electric power output from charging device 200 is represented as in the following equation (2) incorporating the modification of the equation (1).

$$Wout\_chgf = Pbd - Wout \quad (2)$$

There is a case where electric power Wout_chgf output from charging device 200 is negative or zero, which means that the electric power can be supplied to air conditioner 160 only by the discharge power from power storage device 110. Therefore, charging device 200 can be stopped in this case.

On the other hand, there is a case where electric power Wout_chgf output from charging device 200 is positive, which means that the electric power supplied to air conditioner 160 is insufficient only by the discharge power from power storage device 110. Therefore, in this case, there is a need to cause charging device 200 to operate to supply a deficient amount of electric power.

In other words, the above-described Wout_chgf corresponds to the lower limit value of the electric power output from charging device 200, and, for the purpose of protection of power storage device 110 and operation of air conditioner 160, charging device 200 is required to output the electric power corresponding to this lower limit value Wout_chgf at the minimum.

In FIG. 14 which shows the case where power storage device 110 is charged, charging device 200 supplies both of the electric power supplied to power storage device 110 and the electric power used for driving air conditioner 160.

Assuming that the electric power output from charging device 200 at the time when the electric power of charge power upper limit value Win is supplied to power storage device 110 is represented as Win_chgf, the relation among Win, Win_chgf and driving electric power Pbd can be represented as in the following equation (3).

$$Win\_chgf = Win + Pbd \quad (3)$$

As shown in the equation (3), when charging device 200 outputs the electric power exceeding Win_chgf, the electric power exceeding charge power upper limit value Win is to be supplied to power storage device 110.

In other words, Win_chgf corresponds to the upper limit value of the electric power output from charging device 200, and thus, there is a need to control charging device 200 such that the output electric power does not exceed this output upper limit value Win_chgf.

Figure 15:
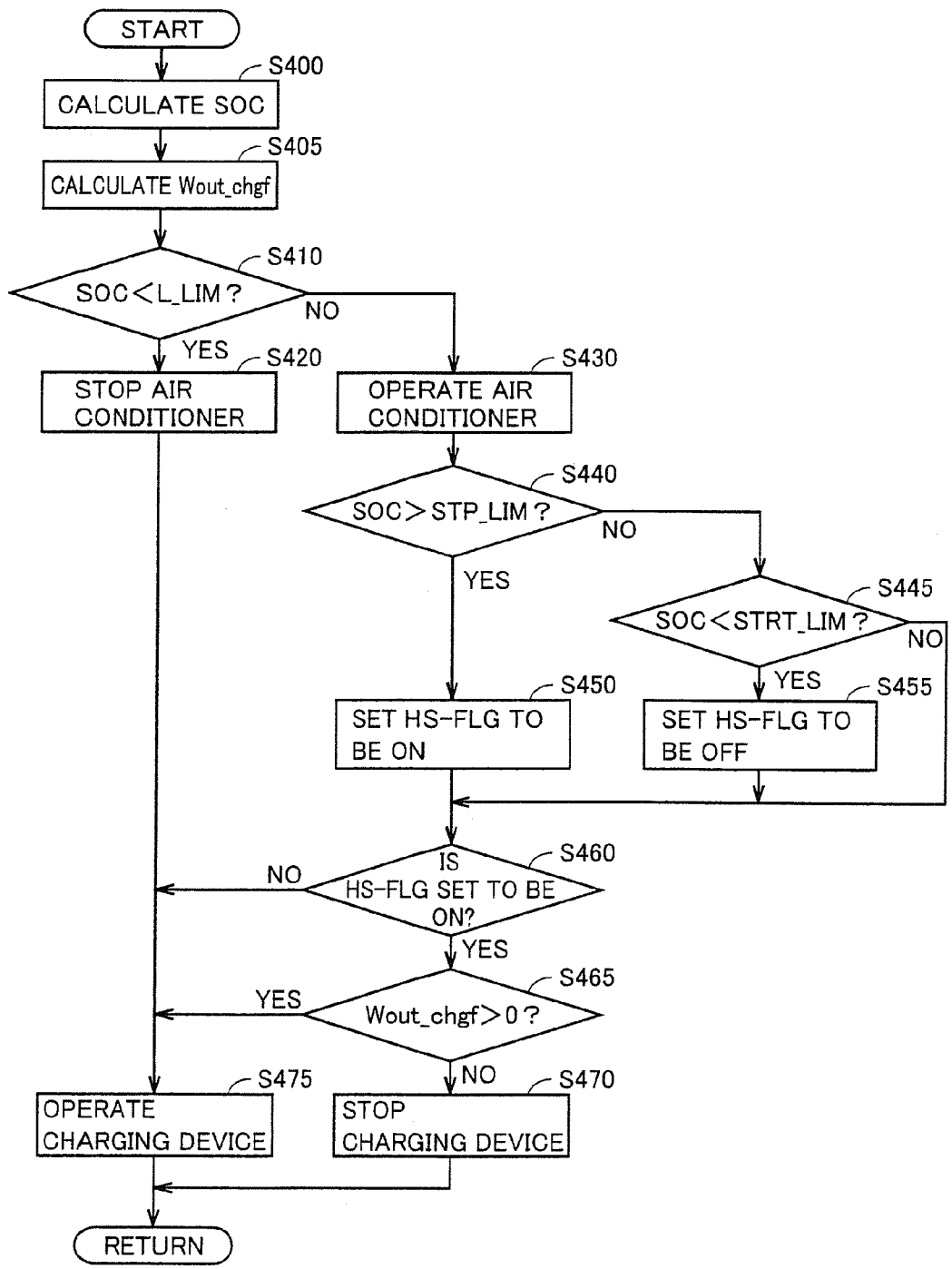
FIG. 15 is a flowchart for illustrating the details of the overcharge prevention control process performed in the ECU and in consideration of the discharge power upper limit value of the power storage device in the second embodiment.

FIG. 15 is a flowchart for illustrating the details of the overcharge prevention control process in consideration of the discharge power upper limit value of power storage device 110 performed in ECU 300 in the second embodiment. FIG. 15 shows the same flowchart as that in FIG. 8 in the first embodiment other than steps S405 and S465 which are additionally provided. In FIG. 15, the description of the steps overlapping with those in FIG. 8 will not be repeated.

Referring to FIG. 15, the SOC of auxiliary machinery battery 180 is calculated in S400. Then, in S405, ECU 300 calculates output lower limit value Wout_chgf of charging device 200 based on discharge power upper limit value Wout of power storage device 110 and the driving electric power of air conditioner 160 obtained based on a control command OPE to air conditioner 160.

In S460, when it is determined that high SOC flag HS-FLG is set to be ON (YES in S460), the process proceeds to S465. In S465, ECU 300 determines whether output lower limit value Wout_chgf is positive or not. It is to be noted that the driving electric power of air conditioner 160 may be calculated by providing feedback of the actual voltage, the actual current, and the like.

When output lower limit value Wout_chgf is not positive (NO in S465), that is, zero or negative, there is no need for charging device 200 to output the electric power. Accordingly, the process proceeds to S470 to cause charging device 200 to be stopped.

On the other hand, when output lower limit value Wout_chgf is positive (YES in S465), the discharge power from power storage device 110 is insufficient. Accordingly, the process proceeds to S475 to cause charging device 200 to be operated.

The control performed in accordance with the above-described processes allows prevention of overcharging of power storage device 110 in the pre-air conditioning during external charging and also allows protection such that the discharge power of power storage device 110 does not exceed discharge power upper limit value Wout.

Third Embodiment

Although the case where one power storage device is provided as a power supply system has been described in the first embodiment, the number of the power storage devices is not limited thereto, but the present invention can also be applied to the case where a plurality of power storage devices are provided.

Figure 16:
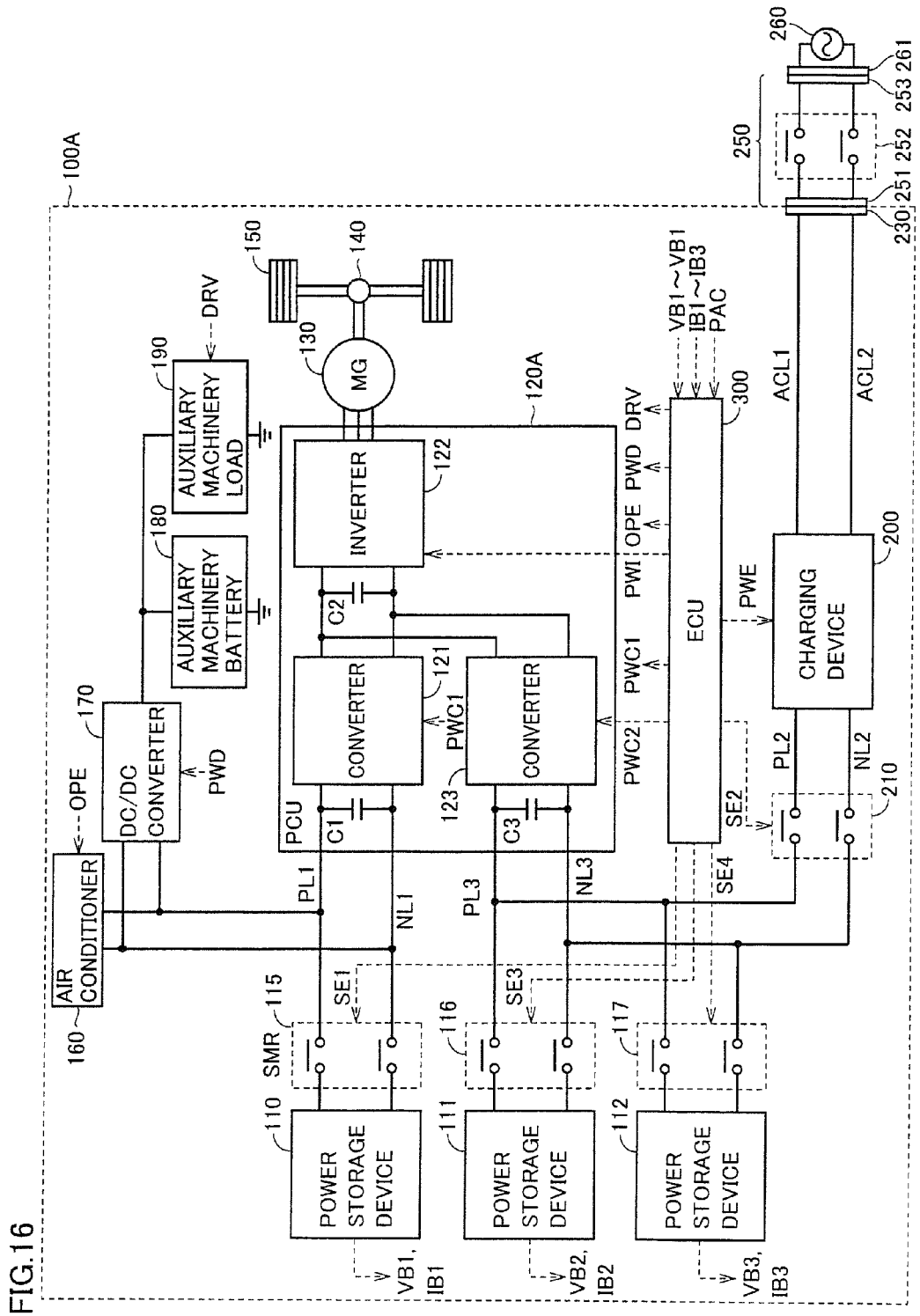
FIG. 16 is an overall block diagram of a vehicle 100A equipped with a power supply system having a plurality of power storage devices according to the third embodiment.

FIG. 16 is an overall block diagram of a vehicle 100A equipped with a power supply system having a plurality of power storage devices according to the third embodiment. In FIG. 16, the description of the components overlapping with those in FIG. 1 in the first embodiment will not be repeated.

Referring to FIG. 16, in addition to power storage device 110, vehicle 100A further includes power storage devices 111 and 112. Vehicle 100A also includes relays 116 and 117 corresponding to power storage devices 111 and 112, respectively. Relays 116 and 117 each have the same function as that of SMR 115 in power storage device 110.

Furthermore, vehicle 100A includes a PCU 120A in place of PCU 120. In addition to converter 121, inverter 122, and capacitors C1 and C2, PCU 120A further includes a converter 123 and a capacitor C3.

Converter 123 is connected in parallel with converter 121 to inverter 122. Furthermore, converter 123 is connected through power lines PL3 and NL3 to power storage devices 111 and 112 which are arranged in parallel with each other.

Based on a control signal PWC1 from ECU 300, converter 121 performs power conversion between power lines PL1, NL1 and power lines HPL, NL1. Based on a control signal PWC2 from ECU 300, converter 123 performs power conversion between power lines PL3, NL3 and power lines HPL, NL1.

Capacitor C3 is provided between power lines PL3 and NL3, to reduce the voltage variation between power lines PL3 and NL3.

Charging device 200 is connected through relay 210 to power lines PL3 and NL3.

The above-described configuration allows power storage devices 110, 111 and 112 to be charged with the electric power from charging device 200. In addition, when power storage device 110 is charged, the electric power output from charging device 200 is raised in voltage by converter 123 and reduced in voltage by converter 121, and then, supplied to power storage device 110.

When performing the pre-air conditioning, the electric power output from charging device 200 is supplied through converter 123 and converter 121 to air conditioner 160 as in the case where power storage device 110 is charged.

During the pre-air conditioning, relays 116 and 117 of power storage devices 111 and 112, respectively, are opened and SMR 115 is closed. This causes air conditioner 160 to be driven with the electric power from charging device 200 and power storage device 110, as in the first embodiment.

Therefore, the configuration of each of the first embodiment, the modification thereof and the second embodiment can be applied also to the power supply system having a plurality of power storage devices as in vehicle 100A. Consequently, overcharging of power storage device 110 can be prevented in the pre-air conditioning during external charging.

It is to be noted that threshold values STP_LIM and STRT_LIM in the present embodiment are cited as examples of the "first reference value" and the "second reference value", respectively, of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100, 100A vehicle, 110, 111, 112 power storage device, 115 SMR, 116, 117, 210, 252 relay, 120, 120A PCU, 121, 123 converter, 122 inverter 130 motor generator, 140 power transmission gear, 150 driving wheel, 160 air conditioner, 170 DC/DC converter, 180 auxiliary machinery battery, 190 auxiliary machinery load, 200 charging device, 230 connecting port, 250 charging cable, 251 charging connector, 253 power supply plug, 260 external power supply, 261 outlet, 300 ECU, 310 charge and discharge control unit, 320 charging device control unit, 330 air conditioner control unit, 340 auxiliary machinery control unit, ACL1, ACL2, HPL, PL1, NL1, PL2, NL2, PL3, NL3 power line, C1, C2, C3 capacitor.

The invention claimed is:

1. A power supply system for an electric powered vehicle comprising:
   a chargeable power storage device;
   a charging device configured to perform external charging for charging said power storage device using alternating-current power supplied from an external power supply;
   an air conditioner receiving electric power from said charging device and said power storage device and air-conditioning a compartment in the electric powered vehicle;
   an auxiliary machinery load receiving the electric power from said power storage device; and
   a control device configured to control at least one of said charging device and said auxiliary machinery load so as to increase the electric power output from said power storage device in a case where overcharging of said power storage device is expected when said air conditioner is intermittently operated during said external charging.

2. The power supply system according to claim 1, wherein said control device detects a state of charge of said power storage device, and, when the state of charge of said power storage device is greater than a first reference value, causes said charging device to stop supplying the electric power.

3. The power supply system according to claim 2, wherein said control device sets a discharge power upper limit value of said power storage device based on the state of charge of said power storage device, and, in a case where the electric power output from said power storage device exceeds said discharge power upper limit value, causes said charging device to output an excess amount of the electric power over said discharge power upper limit value even when the state of charge of said power storage device is greater than said first reference value.

4. The power supply system according to claim 2, wherein said control device increases the electric power output from said charging device when the state of charge of said power storage device is less than a second reference value less than said first reference value.

5. The power supply system according to claim 4, wherein said second reference value is a charge target value at a time when the external charging for said power storage device is completed.

6. The power supply system according to claim 1, wherein said control device detects a state of charge of said power storage device, and, when the state of charge of said power storage device is greater than a first reference value, causes said auxiliary machinery load to consume the electric power stored in said power storage device.

7. The power supply system according to claim 6, wherein said control device causes said auxiliary machinery load to stop consuming the electric power stored in said power storage device when the state of charge of said power storage device is less than a second reference value less than said first reference value.

8. The power supply system according to claim 1, wherein said power storage device includes a plurality of power storage devices.

9. A method for controlling a power supply system for an electric powered vehicle,
the electric powered vehicle including
a chargeable power storage device,
a charging device configured to perform external charging for charging said power storage device using AC power supplied from an external power supply,
an air conditioner receiving electric power from said charging device and said power storage device and air-conditioning a compartment in said electric powered vehicle, and
an auxiliary machinery load receiving the electric power from said power storage device,
said method for controlling comprising the steps of:
causing said air conditioner to operate during said external charging; and
controlling at least one of said charging device and said auxiliary machinery load so as to increase the electric power output from said power storage device, in a case where overcharging of said power storage device is expected when said air conditioner is intermittently operated.

10. The method for controlling the power supply system according to claim 9, further comprising the steps of:
detecting a state of charge of said power storage device; and
causing said charging device to stop supplying the electric power when the state of charge of said power storage device is greater than a first reference value.

11. The method for controlling the power supply system according to claim 10, further comprising the steps of:
setting a discharge power upper limit value of said power storage device based on the state of charge of said power storage device; and
causing said charging device to output an excess amount of the electric power over said discharge power upper limit value even when the state of charge of said power storage device is greater than said first reference value, in a case where the electric power output from said power storage device exceeds said discharge power upper limit value.

12. The method for controlling the power supply system according to claim 10, further comprising the step of increasing the electric power output from said charging device when the state of charge of said power storage device is less than a second reference value less than said first reference value.

13. The method for controlling the power supply system according to claim 9, further comprising the steps of:
detecting a state of charge of said power storage device; and
causing said auxiliary machinery load to consume the electric power stored in said power storage device when the state of charge of said power storage device is greater than a first reference value.

14. The method for controlling the power supply system according to claim 13, further comprising the step of causing said auxiliary machinery load to stop consuming the electric power stored in said power storage device when the state of charge of said power storage device is less than a second reference value less than said first reference value.

* * * * *

UNITED STATES PATENT AND TRADEMARK OFFICE
CERTIFICATE OF CORRECTION

PATENT NO.      : 8,639,413 B2
APPLICATION NO. : 13/259328
DATED           : January 28, 2014
INVENTOR(S)     : Hiroki Endo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 132 days.

Signed and Sealed this

Twenty-second Day of September, 2015

Michelle K. Lee
*Director of the United States Patent and Trademark Office*